US012569864B2

(12) United States Patent
Majher et al.

(10) Patent No.: US 12,569,864 B2
(45) Date of Patent: Mar. 10, 2026

(54) LIQUID DISPENSING PRODUCT HAVING A SPRAY DISPENSER

(71) Applicant: The Procter & Gamble Company, Cincinnati, OH (US)

(72) Inventors: Michael Anthony Majher, Cincinnati, OH (US); Christy Jiayi Zhang, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 267 days.

(21) Appl. No.: 18/504,450

(22) Filed: Nov. 8, 2023

(65) Prior Publication Data

US 2024/0157379 A1     May 16, 2024

Related U.S. Application Data

(60) Provisional application No. 63/423,525, filed on Nov. 8, 2022.

(51) Int. Cl.

| | |
|---|---|
| *A01N 25/06* | (2006.01) |
| *A01P 7/04* | (2006.01) |
| *A01P 13/00* | (2006.01) |
| *B05B 1/34* | (2006.01) |
| *B05B 11/10* | (2023.01) |

(52) U.S. Cl.
CPC ........... B05B 1/3405 (2013.01); A01N 25/06 (2013.01); A01P 7/04 (2021.08); A01P 13/00 (2021.08); B05B 11/1011 (2023.01)

(58) Field of Classification Search
CPC .............................. A61N 25/06; B05B 1/3405
See application file for complete search history.

(56) References Cited

U.S. PATENT DOCUMENTS

| | | | |
|---|---|---|---|
| 6,548,085 B1 | 4/2003 | Zobitne et al. | |
| 9,642,373 B2 * | 5/2017 | Anderson | .............. A01N 25/22 |
| 10,149,481 B2 * | 12/2018 | Bissinger | ............... A61Q 17/02 |
| 10,328,447 B1 | 6/2019 | Vandenbergh | |
| 2009/0008415 A1 | 1/2009 | Ohshima | |
| 2019/0232310 A1 | 8/2019 | Hoefte | |
| 2022/0361507 A1 | 11/2022 | Jactel | |
| 2024/0016144 A1 | 1/2024 | Schmidt | |

OTHER PUBLICATIONS

16417M PCT Search Report and Written Opinion for PCT/US2023/079025 dated Mar. 6, 2024, 13 pages.

* cited by examiner

*Primary Examiner* — Benjamin J Packard
(74) *Attorney, Agent, or Firm* — John M. Lipchitz; Amanda Herman Berghauer

(57)                 ABSTRACT

The present disclosure relates to liquid dispensing products comprising spray dispensers and methods of using such products.

17 Claims, 6 Drawing Sheets

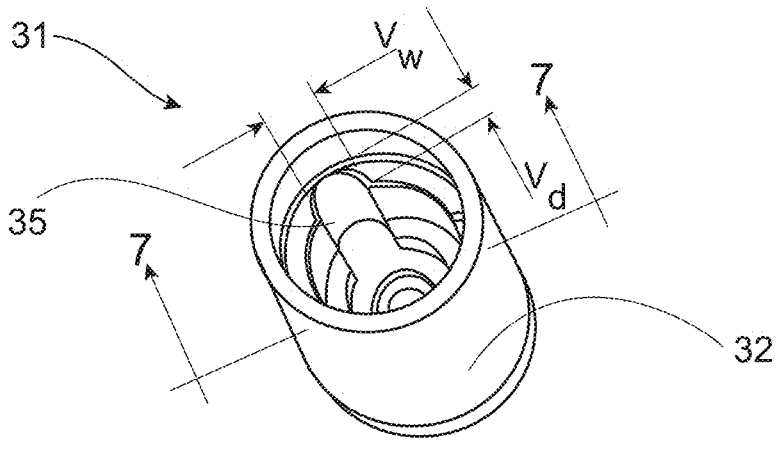
FIG. 5
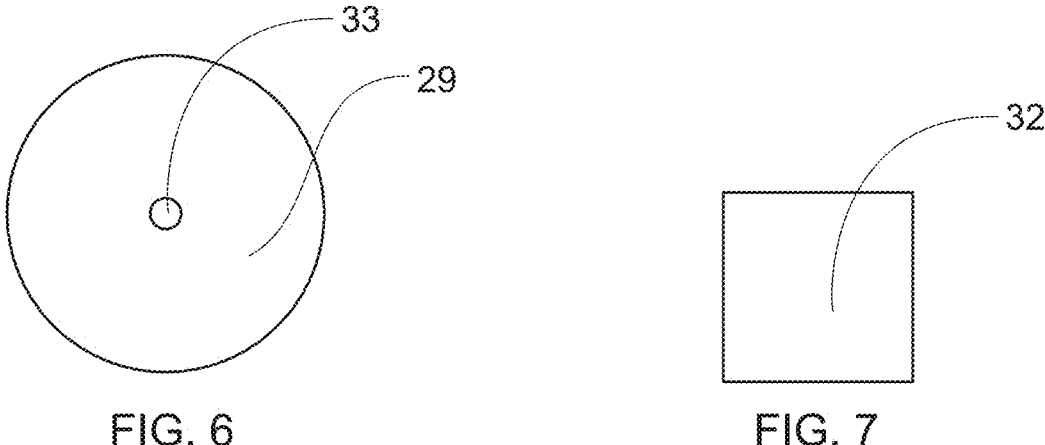
FIG. 6
FIG. 7
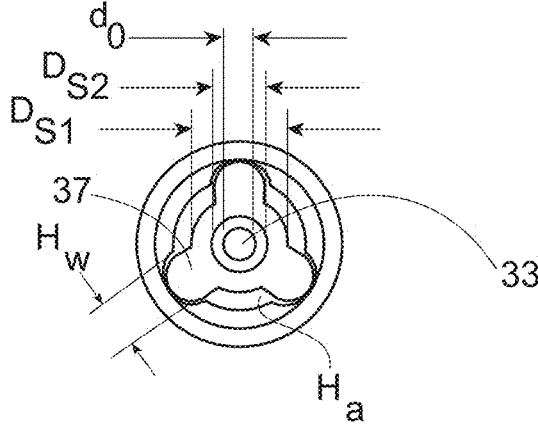
FIG. 8

LIQUID DISPENSING PRODUCT HAVING A SPRAY DISPENSER

FIELD OF THE INVENTION

The present disclosure relates to liquid dispensing products comprising spray dispensers and methods of using such products.

BACKGROUND OF THE INVENTION

Household liquid spray products, ranging from glass and surface cleaning sprays to pest control sprays, are popular among consumers. Many such products are sold in containers attached to manual pump spray dispensers, such as trigger spray dispensers. Manual pump spray dispensers attached to containers allow for the liquid within the container to flow from within the container to a targeted surface with minimal physical exertion by the user. A traditional trigger spray dispenser may have a spray nozzle attached to a shroud housing a pump, and a trigger having for example, a trigger lever, underneath the spray nozzle. The shroud may be attached to the container holding the liquid. The trigger lever may be located beneath the spray nozzle, which allows the user to hold the product and actuate the trigger spray dispenser with only one hand. The user may place his or her index finger on the trigger lever, while wrapping his or her other fingers around the neck of the container underneath the trigger lever. In this configuration, the user may readily point the spray dispenser towards the targeted surface and actuate the trigger by pressing down on the trigger lever.

However, traditional trigger spray dispensers may require a person to repetitively and/or frequently squeeze the trigger to enable product to be dispensed from the trigger spray dispenser. Moreover, the product so dispensed may be dispensed at a variable pressure so that product is dispensed under a relatively low force initially, building to a relatively high force as the trigger is squeezed mid stroke, and during the period when the trigger is near the end of its stroke, the pressure available to dispense product may diminish relatively rapidly. Such pressure fluctuations may cause a great deal of variability in the discharge of the product being dispensed by the trigger spray dispenser.

Manufacturers generally strive to make manual pump spray dispensers, including trigger spray dispensers, easy and convenient to target and operate, without too much force being necessary to actuate the spray dispenser. Manufacturers also strive to ensure that manual spray dispensers, including trigger spray dispensers, provide a consistent discharge of liquid product. For some products, such as pest control products, the targeting and consistency of the spray are particularly important. For example, arthropod pests can move quickly and erratically, which makes it challenging to apply a pest control product in a targeted manner. For weed control, the use of a non-selective herbicide liquid product may require the user to target spray to a particular undesirable weed, while avoiding contact with nearby desirable plants.

In view of the above, there is a continuing unaddressed need for a spray dispenser for liquid products that is easy to use, particularly in a targeted manner, and provides a consistent spray. There is a need for a spray dispenser for liquid pest control products, such as herbicides and insecticides, which is convenient and easy to use in a targeted manner.

SUMMARY OF THE INVENTION

A liquid spray product comprising a spray dispenser connected to a container containing liquid pest control composition comprising: a) from about 0.5% to about 12% by weight of the composition of sodium lauryl sulfate; b) from about 0.5% to about 15% by weight of the composition of an active ingredient selected from the group consisting of cornmint oil, peppermint oil, spearmint oil, rosemary oil, thyme oil, citronella oil, clove oil, cinnamon oil, cedarwood oil, garlic oil, geranium oil, lemongrass oil, eugenol, geraniol, nerol, vanillin, 2-phenylethyl propionate, menthol, menthone, thymol, carvone, camphor, methyl salicylate, p-cymene, linalool, eucalyptol/1,8-cineole, alpha-pinene, bornyl acetate, gamma-terpinene, and mixtures thereof; and c) from about 60% to about 90% by weight of the composition of water; wherein the spray dispenser comprises a nozzle, a buffer system, and a pump; wherein the nozzle comprises an outlet orifice, one or more swirl chambers, one or more vertical inlet ports, and one or more horizontal inlet ports, wherein the one or more vertical inlet ports are in fluid communication with the one or more horizontal inlet ports and the one or more horizontal inlet ports are in fluid communication with the one or more swirl chambers and the outlet orifice.

BRIEF DESCRIPTION OF THE DRAWINGS

FIG. 5 is an isometric view of a nozzle according to the disclosure.

FIG. 6 is a bottom plan view of the nozzle of FIG. 5.

FIG. 7 is a side view of the nozzle of FIG. 5.

FIG. 8 is a top plan view of the nozzle of FIG. 5.

DETAILED DESCRIPTION OF THE INVENTION

Liquid Dispensing Product

The liquid dispensing product comprises a spray dispenser. The spray dispenser may comprise a pump, an actuation element, such as a trigger, a nozzle, and, optionally, a buffer system.

Figure 1:
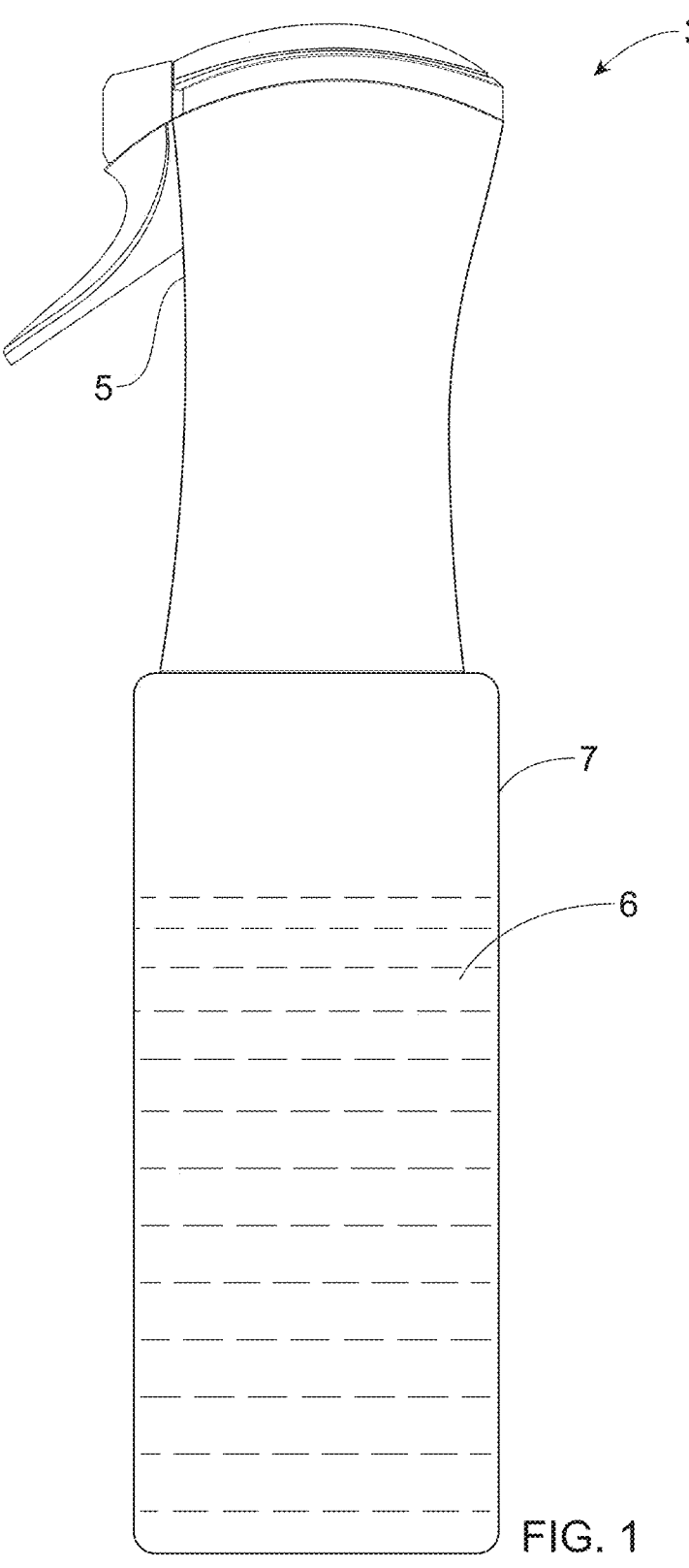
FIG. 1 shows a side view of a liquid dispensing product having a spray dispenser and a liquid composition within a container attached to the spray dispenser.
Figure 2:
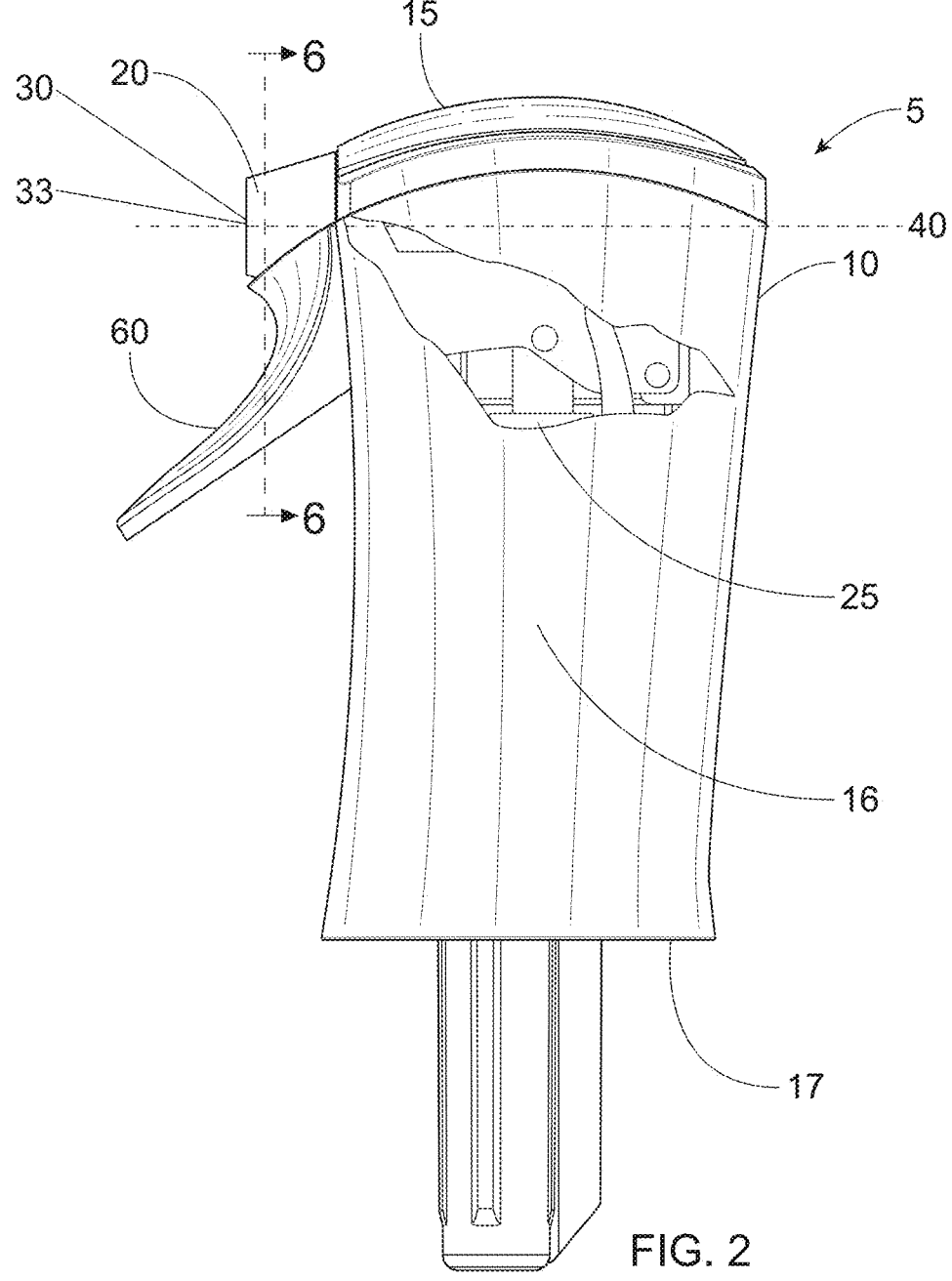
FIG. 2 shows a side view having a cutout of a spray dispenser.

FIG. 1 shows a side view of a liquid dispensing product 3 comprising a spray dispenser 5 and a liquid composition 6 within a container 7 attached to the spray dispenser 5. FIG. 2 shows the side view of a spray dispenser 5. The spray dispenser 5 may comprise a shroud 10 that at least partially houses a pump 25 and, optionally, houses other components of the dispenser. A portion of the shroud 10 in FIG. 2 is partially cut away to show a pump 25. The shroud 10 has a shroud top surface 15, a shroud bottom edge 17 opposing the shroud top surface 15, and shroud walls 16 connecting the shroud top surface 15 to the shroud bottom edge 17.

The spray dispenser 5 may optionally comprise a rotatable nozzle cover 20 housing a discharge nozzle 30. The nozzle cover 20 may be rotatable about a central axis 40. The nozzle cover 20 may be rotatable about a central axis 40 thereof between a discharge unlocked position and a discharge locked position, or among different points to provide a spectrum of quantity of liquid composition 6 flow.

The nozzle 30 may comprise a nozzle orifice 33 where liquid may ultimately exit the spray dispenser 5. The nozzle 30 may be disposed below the shroud top surface 15. The nozzle orifice 33 may be an opening in which the liquid ultimately exits the spray dispenser 5 as it moves through the nozzle 30 and nozzle flow pathway. The nozzle orifice 33 may be the opening at the end of the nozzle flow pathway that is further in distance from the pump 25 or further in distance from the container 7 than the other end of the nozzle flow pathway. The discharge nozzle 30 may extend from the shroud 10. The discharge nozzle 30 may be in fluid communication with the pump 25. The spray dispenser 5 may comprise a trigger 60. The trigger 60 may be operatively engaged with the pump 25. The spray dispenser 5 may optionally comprise a nozzle guard 34 proximate the nozzle cover 20. The guard 34 may inhibit contact by an outside structure or force with the nozzle cover 20 from at least one direction and the guard 34 is not in direct contact with the nozzle 30.

Figure 3:
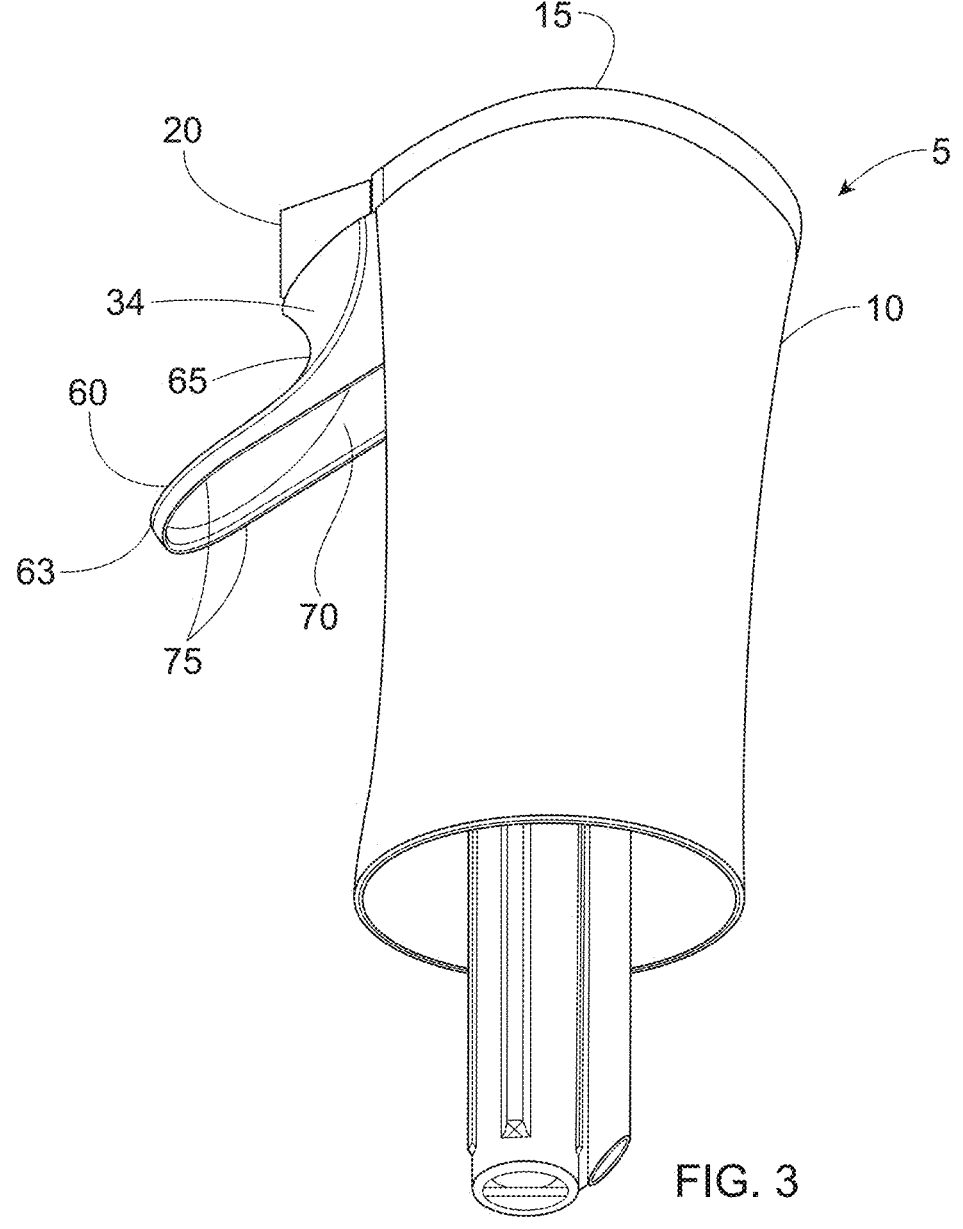
FIG. 3 shows a perspective view of a spray dispenser.

FIG. 3 shows a perspective view of a spray dispenser 5. The spray dispenser 5 may comprise a trigger 60 operatively engaged with the pump 25 (not shown). The trigger 60 may have a trigger front surface 65. The trigger front surface 65 faces away from the shroud 10. The trigger 60 may have an opposing trigger back surface 70. The trigger 60 may have a pair of opposing trigger lateral edges 75. The trigger 60 may comprise a movable part 63, such as a lever, operatively engaged with a means of releasing the movable part (not shown). To actuate the spray dispenser 5, the user places a force on the movable part 63 (e.g., lever), commonly by using the user's finger(s) to press down and move the trigger 60 to a depressed state. This actuation of the trigger 60 in turn actuates the pump 25. The pump, which may comprise a pump chamber and a pump piston located within the pump chamber (not shown), moves liquid from within the container 7 to the spray dispenser 5 and out through the nozzle 30. The nozzle 30 comprises an opening or orifice 33, which is in fluid communication with the pump 25 and through which the liquid ultimately exits the spray dispenser 5.

Figure 4:
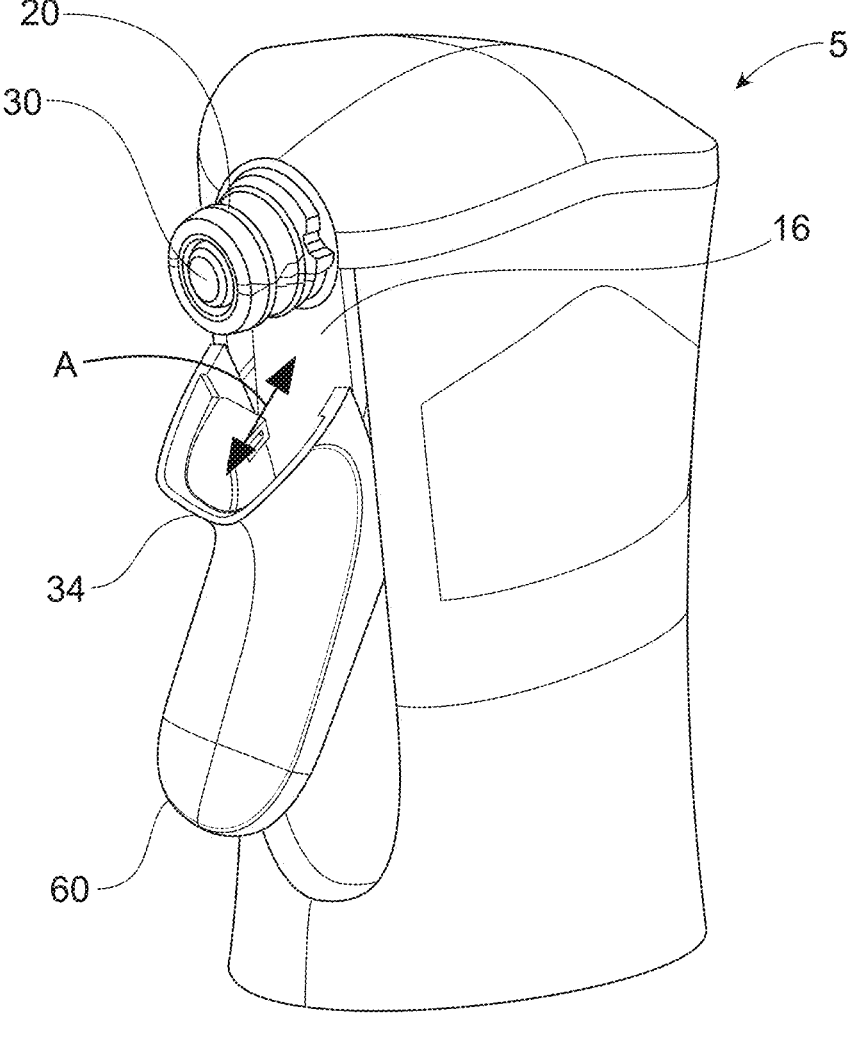
FIG. 4 shows an isometric view of a spray dispenser where the trigger is depressed.

FIG. 4 shows an isometric view of a spray dispenser 5 where the trigger 60 is depressed, or actuated. The spray dispenser 5 may optionally comprise a nozzle cover 20 and/or a nozzle guard 34. The spray dispenser 5 may optionally comprise an area A between the nozzle guard 34 and the shroud walls 16. Such an area A may be of benefit to provide less contact area between the optional nozzle cover 20 and the optional nozzle guard 34 such that less energy is transferred from the guard 34 to the nozzle cover 20 and thus to the nozzle 30 when the guard 34 is affected by an outside structure or force.

Preferably, the spray dispenser is removably attached or attachable to the container. A removably attachable spray dispenser may be conveniently reused. For example, a removably attachable spray dispenser 5 may be readily affixed to a first container that is new and filled with liquid product and, when the first container is emptied of liquid product through operation of the spray dispenser, the user may readily remove the spray dispenser from the first container, procure a second (replacement) bottle filled with liquid product (where the second bottle has an attachment feature that is identical or substantially similar to that of the first container), optionally uncap the second container, and readily attach the spray dispenser to the second container.

Suitable spray dispensers are described in U.S. Pat. Nos. 10,328,447, 10,441,963, and 11,213,842, all of which are hereby incorporated by reference herein. Suitable spray dispensers are available from Guala Dispensing (e.g., TS5 Spray System), Afa Dispensing Group, Belmond, The Netherlands (e.g., under the Flairosol® tradename), and other suppliers.

Shroud and Pump

As shown in FIG. 2, the spray dispenser 5 may comprise a shroud 10. The shroud 10 may house a pump 25. The shroud 10 may partially house a pump 25. The shroud 10 may cover a pump 25 to protect the pump 25 from contact with an outside force. The shroud 10 may house or may partially house any other component typically found in a trigger spray dispenser, such as, for example, a buffer system or a connecting piece to connect the shroud 10 to a container 7. The shroud 10 may comprise a shroud top surface 15. The shroud top surface 15 may obscure the pump 25 from view from at least one direction. The shroud top surface 15 may obscure the pump 25 from view from the top direction.

The shroud 10 may comprise a shroud bottom edge 17 opposing the shroud top surface 15. The shroud 10 may comprise shroud walls 16 connecting the shroud top surface 15 to the shroud bottom edge 17. The shroud walls 16 may surround the pump 25. The shroud walls 16 may partially surround the pump 25. The shroud top surface 15 may lie perpendicular to the shroud walls 16.

The shroud 10 may be of slightly cylindrical or cylindrical shape. The shroud 10 may be of any shape known by one skilled in the art to partially house or house a pump 25. The shroud 10 may be made of plastic. The shroud 10 may be made of any material known to one skilled in the art capable of forming a shroud for a trigger spray dispenser 5 such as that of the current invention. The shroud 10 may be of any shape and curvature to enable ease of gripping by a user. The shroud 10 may comprise gripping features, such as, but not limited to, tapering in the midsection and ridges and/or bumps to enable gripping. Tapering in the shroud 10 may also provide a visual cue to the user as to orientation of the spray dispenser 5. The shroud may also provide a visual cue to the user indicating the proper orientation for attaching the spray dispenser 5 to the container 7.

The shroud 10 may be connected to a container 7. The shroud 10 may be connected to the container 7 at the shroud bottom edge 17. When the shroud 10 is connected to the container 7, the shroud bottom edge 17 may be proximal the container 7. When the shroud 10 is connected to the container 7, the shroud bottom edge 17 may be in contact with the container 7. The shroud 10 may be screwed onto the container 7. The shroud 10 may be snapped onto the container 7. Preferably, the shroud 10 is removably connected to the container 7.

As shown in the partial cutaway of FIG. 2, the shroud 10 may house a pump 25. The pump 25 may be any device or system of devices known to one skilled in the art capable of moving fluids, including liquids and gases, by mechanical action. The pump 25 may be any pump known to one skilled in the art used within spray dispensers, particularly trigger spray dispensers. The pump 25 may comprise a buffer system. The pump 25 may comprise a compression chamber. The pump 25 may comprise a buffer system operatively engaged with a compression chamber. The pump 25 may further comprise any other component known to one skilled in the art required for the functioning of the buffer system and/or compression chamber. The buffer system may comprise a buffer piston. The buffer system may comprise a buffer chamber. The buffer system may comprise a buffer spring. The buffer system may comprise a buffer piston, buffer chamber, and buffer spring. The buffer system may comprise any other component known to one skilled in the art required for the functioning of the buffer system. Examples of buffer systems can be found, for example, in U.S. Pat. No. 10,357,791; U.S. Pub. 2017/0216863; and U.S. Pat. No. 5,240,153.

Trigger

The spray dispenser 5 may comprise a trigger 60. The trigger 60 may be operatively engaged with the pump 25 such that actuation of the trigger 60 in turn may actuate the pump 25. The term "actuation" or any of its derivatives herein refers to the causing of the mechanism or part to operate as its intended purpose. To use the trigger 60, a user may place their finger on the trigger front surface 65 and apply force to the trigger 60 to engage the trigger 60 in actuating the pump 25. The trigger 60 may be any device or system of devices known to one skilled in the art capable of actuating the pump 25 when force is applied. The trigger 60 may be any device or system of devices known to one skilled in the art used in spray dispensers for liquid discharge.

The trigger 60 may extend from the shroud 10. The trigger 60 may be located beneath the nozzle cover 20. At least a portion of the trigger 60 may be located directly beneath the nozzle cover 20. The entire trigger 60 may be located directly beneath the nozzle cover 20. The trigger 60 may face the user when the spray dispenser 5 is facing the user. The trigger 60 may be located on either side of the shroud 10 when the spray dispenser 5 is facing the user. The trigger 60 may be hingedly connected to the pump 25. The trigger 60 may be hingedly connected to the shroud 10.

As shown in FIG. 3, the trigger 60 may have a trigger front surface 65 facing away from the shroud 10, an opposing trigger back surface 70 and a pair of opposing trigger lateral edges 75. The trigger front surface 65 may be where a user places their fingers. The trigger front surface 65 may have ridges to help the user grip the trigger 60. The trigger front surface 65 may be smooth to not cause discomfort to the user. The trigger back surface 70 may have ridges. The trigger back surface 70 may be smooth. The trigger lateral edges 75 may lie perpendicular to the trigger front surface 65. The trigger lateral edges 75 may extend such that the trigger lateral edges 75 are proximal or are in direct contact with the shroud 10.

The trigger 60 may comprise a movable part 63 operatively engaged with a means of releasing the movable part (not shown). The movable part 63 may be, for example, a lever. The means of releasing the movable part may be, for example, a catch or detent. As shown in FIG. 3, the movable part 63 may be a lever or any solid projection a user can apply pressure to in order to actuate the trigger 60. The movable part 63 may be curved for ergonomic support of a user's finger. The movable part 63 may be substantially rectangular for ease of manufacturing. The movable part 63 may have a curved free end for a visual aesthetic benefit and/or to not have sharp edges a user might find uncomfortable. The movable part 63 may be hollow. The movable part 63 may be solid. The movable part 63 may have openings extending through movable part 63.

Nozzle

The nozzle 30 (also referred to herein as the discharge nozzle 30) may extend from the shroud 10. The nozzle 30 may comprise a nozzle orifice 33. The nozzle orifice 33 may be an opening where liquid, such as the liquid composition 6, leaves the liquid dispensing product 3 and the spray dispenser 5. The nozzle orifice 33 may connect to a nozzle flow pathway (not pictured). The nozzle flow pathway may be where liquid, such as the liquid composition 6, flows from within the spray dispenser 5 to the nozzle orifice 33. The nozzle flow pathway may be a hollow chamber. The nozzle flow pathway may be made of any material known to one skilled in the art capable of facilitating the movement of liquid from within the spray dispenser 5 to exiting the liquid dispensing product 3 and the spray dispenser 5 through the nozzle orifice 33. The nozzle flow pathway may be cylindrical. The nozzle flow pathway may be any shape known to one skilled in the art capable of facilitating the movement of liquid, such as the liquid composition 6, from within the spray dispenser 5 to exiting the liquid dispensing product 3 and the spray dispenser 5 through the nozzle orifice 33.

The discharge nozzle 30 may be in fluid communication with the pump 25 such that, when the pump 25 is actuated, liquid flows from the container 7, through the spray dispenser 5, through the nozzle flow pathway, and through the nozzle orifice 33, ultimately exiting the liquid dispensing product 3 onto, for example, a surface.

The nozzle 30 of the spray dispenser may include a sidewall 32 that defines a substantially circular shape, and an endwall 29, where the outlet orifice 33 is disposed in the endwall 29. The shape of the sidewall may be varied such that the nozzle 30 includes, for example, a plurality of sidewalls defining a rectangular shape or any other polygonal shape.

The nozzle 30 of the spray dispenser may have a plurality of vertical inlet ports 35 disposed in the sidewall of the nozzle, a plurality of horizontal inlet ports 37 disposed in the end wall 29 of the nozzle, or both. The horizontal inlet ports 37 may lead to one or more swirl chamber(s) 31, and the swirl chamber(s) 31 may be in fluid communication with the nozzle orifice 33. Thus, the nozzle 30 provides a fluid pathway from the vertical inlet ports 35, to the horizontal inlet ports 37, to the swirl chamber(s) 31, and out through the nozzle orifice 33. The horizontal inlet ports 37 and the swirl chamber(s) 31 lead to a final acceleration and energization of the liquid flow just before leaving the nozzle orifice 33. The nozzle 30 may have a central bore, which may be configured to engage with or receive a protruding part, e.g., a post, of the spray dispenser (not shown). The diameter of the post may be substantially the same as or the same as the diameter of the bore but greater than the diameter of the swirl chamber(s) 31. In other words, the post does not enter into the swirl chamber(s) 31. In this way the liquid is forced to flow through the vertical inlet ports 35, then into the horizontal inlet ports 37, and then into the swirl chamber(s) 31 and out through the orifice 33. This may provide improved flow characteristics of the liquid just before entering the nozzle orifice.

FIGS. 5-9, 10A, 10B, and 11 show various views of the nozzle 30. As noted above, shape of the sidewall may be cylindrical, with the corresponding post in the spray dispenser shaped to correspond to the shape of the sidewall 32. It should be noted that although three horizontal inlet ports 37 and three vertical inlet ports 35 are shown, there can be any number of horizontal inlet ports 37 and vertical inlet ports, including only a single horizontal inlet port and/or a single vertical inlet port.

Figure 9:
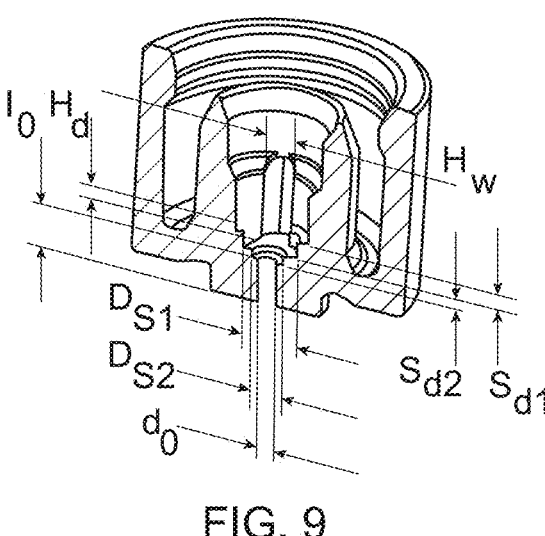
FIG. 9 is a cross-sectional isometric view of the nozzle of FIG. 5, taken along a line 7-7 in a direction of the arrows of FIG. 5.
Figure 10A:
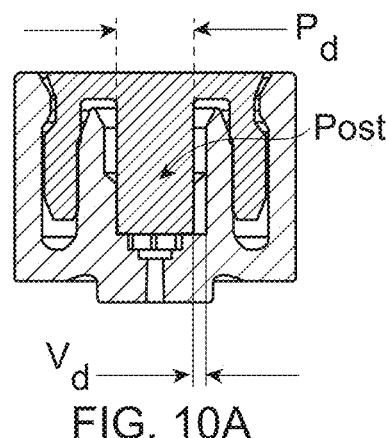
FIGS. 10A and 10B are cross-sectional side views of the nozzle of FIG. 5 taken along line 7-7 in a direction of the arrows of FIG. 5.
Figure 10B:
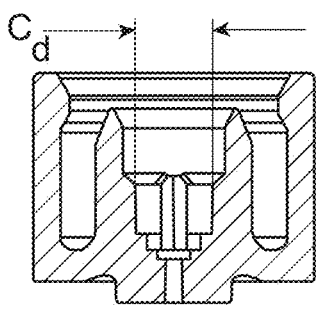
Figure 11:
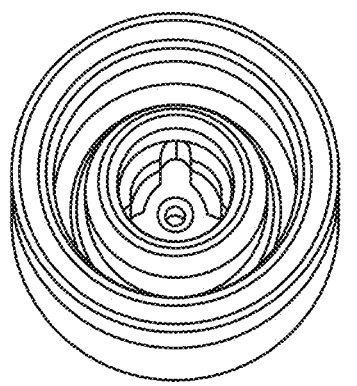
FIG. 11 is an isometric top view of the nozzle of FIG. 5.

The geometry or dimensions of the nozzle 30 are also shown in FIGS. 5-9, 10A, 10B, and 11. For example, the dimensions of the swirl chamber(s) 31 include the "diameter" $D_s$ of the swirl chamber(s) 31 ($D_{s1}$, $D_{s2}$). As is apparent from FIGS. 5-9, 10A, 10B, and 11, the swirl chamber(s) 31 has a substantially circular shape. The swirl chamber(s) 31, however, may take other shapes, such as a square shape, where the diameter $D_s$ represents the maximum diameter of a circle that can be contained in the swirl chamber 31. The dimensions of the swirl chamber(s) also include the depth of the swirl chamber $S_d$ ($S_{d1}$, $S_{d2}$). As shown in FIG. 9, the depths of the two swirl chambers 31 ($S_{d1}$, $S_{d2}$), may be different than the depth of the horizontal inlet ports 37 ($H_d$) provided to the swirl chambers 31. Alternatively, the depth of the swirl chamber(s) 31 may be the same as the depths of the horizontal inlet ports 37. The horizontal inlet ports 37 have the following dimensions: a width ($H_w$), a depth ($H_d$), and an angle ($H_a$), as shown in FIGS. 8 and 9. The vertical inlet ports 35 have the following dimensions: a width ($V_w$) and depth ($V_d$), as shown in FIGS. 5 and 10A. The outlet orifice 33 has a diameter $d_o$ and a land length $l_o$, which extends from the bottom-most swirl chamber 31 to the outlet of nozzle.

The horizontal inlet ports 37 leading to the swirl chamber(s) 31 may be substantially rectangular in shape. As noted above, that the number of horizontal inlet ports 37 provided to the swirl chamber(s) 31 can be varied. Along these lines, the shape and angle of the horizontal inlet ports 37 with respect to the swirl chamber 31 can also be varied.

The nozzle disclosed herein may be particularly beneficial for use in a spray dispenser having a buffer system, as when a spray dispenser has a buffer system, actuation of the trigger 60 may result in an increase of liquid composition 6 into the buffer system. The increase of liquid composition 6 into the buffer system may lead to greater pressure in the buffer system until the liquid composition 6 is discharged through the nozzle 30. When there is a barrier to the nozzle flow path and the trigger 60 is capable of being actuated, even slightly, more liquid composition 6 may move into the buffer system and the pressure will increase. Too high a pressure build-up may damage the spray dispenser 5 system. Additionally, a pressure build-up may result in undesirable spray patterns as the pressure may affect the particle size upon spraying of the liquid composition, which may lead to an unintended more mist-like spray pattern. Surprisingly, the nozzle geometry or dimensions, as disclosed herein, are selected to reduce such pressure build-up.

All the above considerations may be used in designing or optimizing the liquid spray product disclosed herein. For example, the nozzle, the pump, and the optional buffer system may be configured and dimensioned to dispense the liquid composition in a selected, optimal spray pattern, e.g., a spray pattern optimized for a pest control product, such as an herbicide. By dispensing the spray in a selected, optimal spray pattern, the effectiveness of the liquid product may be increased. Optimal spray patterns may be achieved, for example, through modifications of the nozzle design of the spray dispenser. The volumes and relative volumes of pump chamber and buffer system may also be optimized for a given application and context.

Optional Nozzle Cover

The spray dispenser 5 may optionally comprise a nozzle cover 20. The nozzle cover 20 may house the discharge nozzle 30 to protect the nozzle 30 from contact with an outside force. The nozzle cover 20 may surround or partially surround the nozzle 30. The nozzle cover 20 may partially house the nozzle flow pathway. The nozzle 30 may have a central axis and the nozzle cover 20 may be rotatable about the nozzle 30 central axis. The nozzle 30 central axis may be the same as the nozzle cover 20 central axis 40. The nozzle cover 20 may be rotatable about a central axis 40 thereof. The nozzle cover 20 may be attached to the nozzle 30 by any means of attachment known to one skilled in the art, preferably an attachment that enables the nozzle cover 20 to rotate. The nozzle cover 20 may be of any shape known to one skilled in the art to partially house or house the nozzle 30. The nozzle cover 20 may have gripping features such as, but not limited to, ridges and/or bumps, which may assist the user in gripping and rotating the nozzle cover 20. The nozzle cover 20 may have one or more visual cues, such as, but not limited to, text and/or arrows guiding the user to which direction the user is to rotate the nozzle cover 20 to lock and to unlock the spray dispenser 5.

Optional Nozzle Guard

The spray dispenser 5 may comprise a nozzle guard 34. The nozzle guard 34 may be proximate the nozzle cover 20. The nozzle guard 34 may inhibit contact by an outside structure or force with the nozzle cover 20 from at least one direction. The guard 34 may not be in direct contact with the nozzle 30. Without wishing to be bound by theory, the guard 34 not being in direct contact with the nozzle 34 may allow for less energy to be transferred from a contact with an outside structure or force exerted on the guard 34 to the nozzle 30, such that the nozzle 30 will not be misaligned. The nozzle guard 34 may be in direct contact with one or more points with the nozzle cover 20. However, it may be beneficial for the nozzle guard 34 to have as few points of contact with the nozzle cover 20 for reasons provided above.

The nozzle guard 34 may be of any shape conducive to inhibiting contact from an outside structure or force to the nozzle cover 20. For example, when the nozzle cover 20 is of slightly conical shape, the guard 34 may also take a curved shape such that the guard 34 may partially surround the nozzle cover 20.

Container

The container 7 for use in liquid spray products of the disclosure may be a plastic container or a metallic container, such as a steel or aluminum canister. Preferably, the container is a plastic container. "Plastic" refers to any synthetic or organic material that can be molded or shaped, generally when heated, and then hardened into a desired form including, but not limited to, polymer, resin, and cellulose derivative.

The plastic may be polymeric and may be partially, substantially, or entirely comprised of polyester; polyethyleneterephthalate ("PET"); polyethylene napthalate, polyethylene furanoate, polyamide (PA); nylon 6/6, nylon 66, nylon 11, polycarbonate (PC); polyoxymethylene; polyacrylonitrile; polyolefin; polyethylene (PE), polypropylene (PP), fluoropolymer; poly(butylene succinate); polyvinylchloride (PVC); polystyrene (PS); virgin, recycled, and regrind versions of polymer materials; bio-based and petroleum-based versions of polymer materials; and mixtures thereof. The plastic container may comprise multiple layers of other polymer materials. By polymeric it is meant that the component is formed of a material which is plastic, comprises polymers, and/or particularly polyolefin, polyester, or nylons. Thus, the entire plastic container or certain components thereof may be free of metal.

The container 7 may be opaque, transparent, or translucent. Preferably, the container 7 is at least partially transparent or translucent. The container 7 may comprise a transparent portion, such as a window. The transparent or translucent container may have a light transmittance of greater than 25% at wavelength of about 410-800 nm. The transparent portion of the container 7 may have a transmittance of more than about 25%, or more than about 30%, or more than about 40%, or more than about 50% in the visible part of the spectrum (approx. 410-800 nm). Alternatively, absorbency of the container 7 may be measured as less than about 0.6 or by having transmittance greater than about 25%, where % transmittance equals:

$$\frac{1}{10^{absorbancy}} \times 100\%$$

For purposes of the disclosure, as long as one wavelength in the visible light range has greater than about 25% transmittance, it is considered to be transparent/translucent.

Liquid Composition

The liquid dispensing product may comprise a liquid composition 6, which may be housed within the container 7. The container 7 may store from about 50 g to about 800 g, or from about 150 g to about 700 g, or from about 200 g to about 600 g, of the composition. The weight of the liquid dispensing product, including the composition, is preferably selected to enable a user to comfortably manipulate and actuate the product with one hand, while providing enough composition to treat one or multiple target areas/surfaces of varying sizes, once or multiple times, e.g., multi-use product (e.g., a multi-use product). The liquid dispensing product may be a consumer use product intended to be sprayed onto a target surface. Non-limiting examples of consumer use products include home care products, such as hard floor cleaners and conditioners, carpet cleaners and conditioners, carpet deodorizers, carpet spot cleaners, window cleaners, fabric refreshing sprays (e.g., for clothing or furniture), hard surface cleaners (e.g., for dishware, sinks, countertops), and air fresheners; car care products, such as upholstery cleaners and conditioners, hard surface cleaners, leather cleaners, carpet cleaners, wheel cleaners, tire cleaners, and automotive glass cleaners; pest control products, such as herbicides, insecticides, insect barrier products, and garden insecticides. The liquid dispensing products may also be suitable for commercial and/or institutional use.

The liquid composition may have a Brookfield viscosity ranging from about 1 cps to about 500 cps, or from about 1 cps to about 300 cps, or from about 1 cps to about 200 cps, or from about 1 cps to about 100 cps, or from about 2 cps to about 100 cps, or from about 3 cps to about 50 cps, as measured according to the method described herein. The Brookfield viscosity may enable the liquid dispensing product to dispense the composition as droplets. For some products, such as pesticide products, droplets may be preferred, particularly versus a mist, a stream, or a foam. The composition may have a surface tension from about 10 mN/m to about 60 mN/m, or from about 15 mN/m to about 50 mN/m, or from about 18 mN/m to about 40 mN/m, or from about 20 mN/m to about 30 mn/m, or from about 22 mN/m to about 28 mN/m, as measured according to the method described herein. It is believed that droplets may be preferred for delivering a targeted spray (particularly for non-selective herbicide compositions), while also sufficiently covering a target area.

The composition may comprise particles having an intensity mean particle size of from about 2 nm to about 500 nm, alternatively from about 3 nm to about 400 nm, alternatively from about 4 nm to about 100 nm. The composition may comprise particles having an intensity mean particle size of less than about 1 micron, preferably less than about 500 nm. Mean intensity particle size can be measured according to the Particle Size Test Method described hereafter.

The composition may comprise particles having a volume mean particle size ranging from about 1 nm to about 100 nm, or from about 2 nm to about 50 nm, or from about 2 nm to about 25 nm, or from about 2 nm to about 10 nm. The composition may comprise particles having a volume mean particle size of less than about 1 micron, preferably less than about 500 nm. Mean volume particle size can be measured according to the Particle Size Test Method described hereafter. Volume mean particle size may be selected to provide a transparent or translucent composition, as well as to efficiently deliver an active agent to the target surface or area.

The composition may have a NTU value less than about 200, or less than about 100 or from about 0.5 to about 50, or from about 1 to about 25. A composition having a NTU value in the disclosed ranges may be perceived by a consumer as being clear, transparent, or translucent, which may connote purity, quality, and/or that the composition is not likely to stain surfaces.

The composition may have a b* value from about 0 to about 5, or from about 0.01 to about 4, or from about 0.05 to about 3.5, or from about 0.1 to about 3. A composition with a b* value according to the disclosed ranges may be perceived by a consumer as having a colorless appearance, while b* values outside the disclosed ranges, especially b* values greater than 5, may appear yellow to a consumer, which may connote that the composition contains impurities, has degraded, and/or is unsuitable for use.

As noted above, at least a portion of the container 7 may be transparent or translucent. A transparent or translucent portion thereof (e.g., a window) may allow a user to view the composition inside the container 7, without having to dispense the composition. This may be particularly desirable for compositions having NTU values less than about 200 and/or having b* values from about 0 to about 5.

Preferably, the liquid dispensing product is a pest control product comprising a pest control composition. As used herein, "pest control" means the management of a pest species, including any animal, such as insects and other arthropods, plant, or fungus that adversely impacts human activities or the environment, where management includes controlling, killing, eliminating, repelling, or attracting the pest species. The terms "pest control" and "pesticide" are used interchangeably and it is understood that a composition or an ingredient that has "cidal" activity, e.g., pesticide, insecticide, herbicide, fungicide, may or may not kill and/or eliminate the target pest, e.g., arthropod, insect, weed, or fungus. As used herein, "cide" and "cidal" includes compositions, compounds, components, ingredients, materials, etc., which are effective to kill, remove, destroy, defoliate, exterminate, eradicate, eliminate, etc., a target pest, as well as to retard, regulate, inhibit, prevent, etc., the survival, growth, and/or proliferation of such pest.

Pest control products and compositions may include products and compositions for managing a pest species inside and outside of a building, such as a dwelling or a business, including, but not limited to, areas such as garages, patios, balconies, screened porches, lawns, and/or gardens. Pest control products and compositions may include products and compositions for use in and/or on yards, lawns, bushes, trees, and/or outdoor plants, as well as for use on or around indoor plants. Pest control products and compositions may include selective and non-selective products and compositions, such as selective and non-selective herbicides, fungicides, and insecticides. Pest control products and compositions may also include products and compositions for topical application to humans to control or repel pest species, such as insects and other arthropods.

In particular, the market for weed control products and arthropod pest control products is growing, due to factors such as an increase in urban housing, changes in weather patterns, and an increase in home food gardening and the desire to keep lawns, flower beds, etc. looking neat and attractive. At the same time, there is increasing consumer demand for insecticide and herbicide products that are natural and non-toxic. Consumers also prefer herbicide and insecticide products that contain a limited number of ingredients and/or recognizable ingredients, as communicated by simpler ingredient statements. However, these products are still expected to be efficacious and efficiently control weeds and arthropods, comparable to traditional chemical pesticide products. Also, there are existing herbicide and insecticide products that contain natural ingredients, such as plant essential oils. However, these existing products have a number of disadvantages: some products are messy or difficult to use and some products have limited efficacy.

The pest control composition may be oil-based and comprises at least one carrier oil. The carrier oil may be a hydrocarbon oil, such as a hydrocarbon oil derived from petroleum, animal, or plant sources. An example of a suitable petroleum-derived oil is mineral oil. An example of a suitable animal-derived oil includes fish oil. Examples of suitable plant-derived oils include corn oil, soybean oil, palm oil, rapeseed oil, sesame oil, wheat oil, wheat germ oil, coconut oil, canola oil, sunflower oil, safflower oil, peanut oil, olive oil, and castor oil. The hydrocarbon oil may be paraffinic, naphthenic and/or aromatic. The pest control composition may comprise a single carrier oil or a mixture of carrier oils. The pest control composition may comprise greater than about 25 percent by weight of a carrier oil, or from about 30% by weight to about 99.5% by weight of a carrier oil, or from about 50% by weight to about 98% by weight of a carrier oil, or from about 80% by weight to about 95% by weight of a carrier oil or from about 85% by weight to about 95% by weight of a carrier oil. Pest control compositions comprising carrier oils are described in US Pat. Pub. No. 2021/0169061A1, which is hereby incorporated by reference herein.

Alternatively, the pest control compositions may be substantially free of a geologically derived (e.g., petroleum-based) carrier oils, such as mineral oil, as products containing a carrier oil may be messy to use and may leave a residue on a treated surface.

The pest control compositions may comprise from about 40% to about 99%, or from about 45% to about 99%, by weight of the composition of water. The pest control composition may comprise from about 40% to about 95%, or from about 60% to about 95% water, or from about 50% to about to about 90%, or from about 70% to about to about 90%, or from about 55% to about 80%, or from about 78% to about 83%, or from about 58% to about 78%, or from about 60% to about 75%, or from about 62% to about 72% by weight of the total composition of water. Such pest control compositions comprising water are described in U.S. application Ser. No. 17/865,943, U.S. application Ser. No. 18/082,891, U.S. application Ser. No. 18/334,004, and U.S. Provisional App. Ser. Nos. 63/509,339 and 63/509,380, all of which are hereby incorporated by reference herein.

Suitable herbicide compositions may also comprise from about 40% to about 99% by weight of the composition of water and are described in WO App. Ser. No. PCT/US23/68554 and U.S. Provisional App. Ser. No. 63/355,134, which are hereby incorporated by reference herein.

The pest control compositions of the present disclosure may comprise renewable components. The compositions disclosed herein may comprise from about 1%, or from about 5%, or from about 10%, or from about 20% or from about 30%, of from about 40% or from about 50%, to about 40%, or to about 50%, or to about 60% or to about 70% or to about 80% or to about 90%, or to about 100% by weight of renewable components. The compositions disclosed herein may be at least partially or fully bio-based, As such, the composition can comprise a bio-based carbon content of about 50% to about 100%, preferably about 70% to about 100%, more preferably about 75% to about 100%, even more preferably about 80% to about 100%, most preferably about 90% to about 100%. The percent bio-based carbon content can be calculated as the "percent Modern Carbon (pMC)" as derived using the methodology of ASTM D6866-16. The compositions of the present disclosure may be substantially free of petroleum-derived solvents or petroleum-derived surfactants.

The compositions disclosed herein may comprise less than about 15 ingredients, preferably less than about 10 ingredients, more preferably less than about 15 ingredients and greater than about 5 ingredients.

The compositions disclosed herein may comprise ingredients listed under section 25(b) of the Federal Insecticide, Fungicide, and Rodenticide Act (FIFRA), incorporated herein by reference in its entirety. The compositions disclosed herein may comprise naturally occurring compounds or extracts or derivatives thereof. The compositions disclosed herein may comprise at least one organic, certified organic, US Department of Agriculture ("USDA") National Organic Program compliant ("NOP-compliant") ingredient. The compositions disclosed herein may comprise at least one ingredient that is food grade or generally recognized as safe (GRAS). The GRAS ingredient may include any agent listed on the FDA's GRAS list, including direct food additives (see, e.g., US law (sections 201(s) and 409 of the Federal Food, Drug, and Cosmetic Act, November 2016). The GRAS ingredient may also include, but is not limited to, agents that are generally recognized, among experts qualified by scientific training and experience to evaluate their safety, as having been adequately shown through scientific procedures (or, in the case of a substance used in food prior to Jan. 1, 1958, through either scientific procedures or through experience based on common use in food) to be safe. The use of food grade or GRAS ingredients enables the compositions disclosed herein to be used by consumers without rinsing a treated surface after use. The compositions disclosed herein may comprise ingredients that have a tolerance or tolerance exemption for use on food contact surfaces under the Federal Food, Drug, and Cosmetic Act US law (see, e.g., 40 CFR 180, November 2016, December 2015 update).

Active Ingredients

The pest control composition may comprise one or more active ingredients (also referred to herein as actives). The pest control composition may comprise from about 0.005% to about 30%, or from about 0.05% to about 25%, or from about 0.15% to about 20%, or from about 0.5% to about 15%, or from about 1% to about 12%, or from about 2% to about 10% of the composition of one or more active ingredients.

Nonlimiting examples of active ingredients include aldehyde C16 (pure), almond oil, terpenes, alpha-terpineol, verbenone, alpha-cedrene, cinnamic aldehyde, amyl cinnamic aldehyde, cinnamyl acetate, amyl salicylate, anisic aldehyde, citric acid, cedrol, benzyl alcohol, benzyl acetate, cinnamaldehyde, cinnamic alcohol, carvacrol, caryophyllene, carveol, citral, citronellal, methylheptenone, citronellol, dimethyl salicylate, eucalyptol (also known as 1,8-cineole), thujopsene, 3-thujopsanone, alpha-thujone, betathujone, fenchone, eugenyl acetate (e.g., isoeugenyl acetate), eugenol, iso-eugenol, methyl iso-eugenol, galaxolide, geraniol, guaiadiene, guaiacol, ionone, menthol (e.g., L-menthol), menthyl ester, menthone, carvone (e.g., L-carvone), camphor, camphene, p-cymene, borneol, bornyl esters, bornyl acetate, isobornyl acetate, terpinene (e.g., gamma-terpinene), methyl anthranilate, methyl ionone, methyl salicylate, nerol, phellandrene (e.g., alpha-phellandrene), pennyroyal oil, perillaldehyde, 1- or 2-phenyl ethyl alcohol, 1- or 2-phenyl ethyl propionate, piperonal, piperonyl acetate, piperonyl alcohol, D-pulegone, terpinen-4-ol, terpinyl acetate, 4-tert butylcyclohexyl acetate, myrcene, chavicol, acetaldehyde, safrole, terpinen-4-ol, cineole, dimethyl trisulfide, diallyl disulfide, diallyl sulfide, diallyl tetrasulfide, 3-vinyl-[4H]-1,2-dithiin, thyme oil, thyme oil white, thyme oil red, thymol, anethole (e.g., trans-anethole), vanillin, ethyl vanillin, castor oil, cedar oil, cedarwood oil, cinnamon, cinnamon oil, citronella, citronella oil, clove, clove oil, corn oil, corn mint oil, oregano oil, cottonseed oil, garlic, garlic oil, geranium oil, lemongrass oil, linseed oil, mint, mint oil, peppermint, peppermint oil, spearmint, rose oil, spearmint oil, rosemary, rosemary oil, sesame, sesame oil, soybean oil, white pepper, licorice oil, wintergreen oil, anise oil (e.g., star anise oil), lilac flower oil, black seed oil, bay oil, grapefruit seed oil, grapefruit, lemon oil, orange oil, orange flower oil, tea tree oil, cedar leaf oil, camphor oil, Tagete minuta oil, lavender oil, Lippia javancia oil, oil of bergamot, galbanum oil, eucalyptus oil, lovage oil, and mixtures thereof.

The pest control composition may comprise about 0.005% to about 15%, preferably from about 0.05% to about 15%, more preferably from about 0.15% to about 12%, even more preferably from about 0.5% to about 10% of one or more active ingredients selected from the group consisting of eugenol, 2-phenylethyl propionate, menthol, menthone, amyl butyrate, geraniol, limonene (e.g., d-limonene), p-cymene, linalool, linalyl acetate, camphor, methyl salicylate, pinene (e.g., alpha-pinene, beta-pinene), eucalyptol, piperonal, piperonyl alcohol, tetrahydrolinalool, thymol, carvone (e.g., L-carvone), vanillin, ethyl vanillin, iso-eugenol, bornyl acetate, isobornyl acetate, terpinene (e.g., gamma-terpinene), cinnamyl acetate, cinnamic alcohol, cinnamaldehyde, ethyl cinnamate, pyrethrins, abamectin, azadirachtin, amitraz, rotenone, boric acid, spinosad, biopesticides, synthetic pesticides, and mixtures thereof.

The pest control composition may comprise one or more synthetic pesticides. Nonlimiting examples of synthetic pesticides include pyrethroids, such as bifenthrin, esfenvalerate, fenpropathrin, permethrin, cypermethrin, cyfluthrin, deltamethrin, allethrin, lambda-cyhalothrin, or the like; synergists, such as piperonyl butoxide, or the like; juvenile hormone analogues, such as methoprene, hydroprene, kinoprene, or the like; and neonicotinoids, such as imidacloprid, acetamiprid, thiamethoxam, or the like, and mixtures thereof. The pest control composition may comprise less than about 10%, such as from about 0.00005% to about 10%, or less than about 5%, such as from about 0.0001% to about 5%, or less than about 2%, such as from about 0.001% to about 2%, or less than about 1%, such as from about 0.01% to about 1%, or less than about 0.5%, or less than about 0.1% by weight synthetic pesticide. The pest control composition may be substantially free of synthetic pesticide.

The pest control composition may comprise one or more biopesticides. Nonlimiting examples of biopesticides include pyrethrum, rotenone, neem oil, and mixtures thereof.

The pest control composition may comprise from about 0.15% to about 15%, or from about 0.5% to about 15%, or from about 0.5% to about 15%, or from about 0.5% to about 10%, by weight of the composition of one or more active ingredients, where the active ingredient is an essential plant oil. The pest control composition may comprise one or more essential plant oils selected from the group consisting of corn mint oil, peppermint oil, spearmint oil, rosemary oil, thyme oil, citronella oil, clove oil, cinnamon oil, cedarwood oil, garlic oil, geranium oil, lemongrass oil, and mixtures thereof, preferably selected from the group consisting of corn mint oil, spearmint oil, rosemary oil, thyme oil, and mixtures thereof, more preferably selected from the group consisting of corn mint oil, rosemary oil, and combinations thereof.

Surfactant

The pest control composition disclosed herein may be formulated with one or more surfactants. The pest control composition may comprise from about 0.01% to about 15%, or from about 0.1% to about 10%, or from about 1% to about 10%, or from about 1% to about 12.5%, or from about 1% to about 15%, or from about 1% to about 8% of one or more surfactants, preferably one or more anionic surfactants, more preferably sodium lauryl sulfate.

A sprayed drop of a pesticidal composition comprising an active agent is preferably able to wet a target surface and spread out or cover a target area to perform its intended function. A surfactant generally reduces the surface tension of the water on the surface of the spray drop by reducing the interfacial tension between the spray drop and target surface, e.g., exoskeleton of an arthropod. Surfactants also wet and disperse particles of active ingredient(s) in the composition prior to spraying, thereby enabling more uniform coverage and wetting of the target upon spraying. Surfactants may also function to emulsify active agents that are not easily solubilized in water, such as oils. Surfactants thus include various agents known to function as emulsifiers or wetting agents. Suitable surfactants include anionic surfactants, amphoteric surfactants, zwitterionic surfactants, nonionic surfactants, cationic surfactants, or mixtures thereof.

Anionic surfactants are surfactant compounds that contain a long chain hydrocarbon hydrophobic group in their molecular structure and a hydrophilic group, including salts such as carboxylate, sulfonate, sulfate or phosphate groups. The salts may be sodium, potassium, calcium, magnesium, barium, iron, ammonium and amine salts of such surfactants. Anionic surfactants include the alkali metal, ammonium and alkanol ammonium salts of organic sulfuric reaction products having in their molecular structure an alkyl or alkaryl group containing from about 8 to about 22 carbon atoms and a sulfonic or sulfuric acid ester group. Examples of such anionic surfactants include water soluble salts and mixtures of salts of alkyl benzene sulfonates having from about 8 to about 22 carbon atoms in the allyl group (e.g., linear alkyl benzene sulfonates, such as dodecylbenzene sulfonate and salts thereof), alkyl sulfates and alkali metal salts thereof (preferably those having from about 8 to about 22 carbon atoms in the alkyl group, e.g., sodium dodecyl/lauryl sulfate), alkyl ether sulfates having from about 8 to about 22 carbon atoms in the alkyl group and about 2 to about 9 moles of ethylene oxide (e.g., sodium laureth sulfate). Aryl groups generally include one or two rings, alkyl groups generally include from about 8 to about 22 carbon atoms, and ether groups generally comprise from about 1 to about 9 moles of ethylene oxide (EO) and/or propylene oxide (PO), preferably EO. A preferred anionic surfactant is sodium lauryl sulfate or SLS (also known as sodium dodecyl sulfate). The pest control composition may comprise from about 1% to about 10%, preferably from about 2% to about 8.5%, or from about 4% to about 8%, by weight of the composition of sodium lauryl sulfate.

Anionic surfactants also include fatty acids and salts thereof. Fatty acids and salts thereof are organic molecules comprising a single carboxylic acid moiety (carboxylate anion in salts) and at least 7 carbon atoms, or from about 11 to about 22 carbon atoms, or from about 12 to about 16 carbon atoms. The salts may be sodium, potassium, calcium, magnesium, barium, iron, ammonium and amine salts of fatty acids. The salts of fatty acids are also known as soaps. Fatty acid and the salts thereof may be linear, branched, saturated, unsaturated, cyclic, or mixtures thereof. Nonlimiting examples of fatty acids and salts thereof include octanoic acid, nonanoic acid, decanoic acid, lauric acid, myristic acid, palmitic acid, stearic acid, arachidic acid, behenic acid, lignoceric acid, myristoleic acid, palmitoleic acid, sapienic acid, oleic acid, elaidic acid, vaccenic acid, linoleic acid, linoelaidic acid, arachidonic acid, eicosapentaenoic acid, erucic acid, docosahexaenoic acid, the sodium, calcium, potassium or zinc salts thereof, or mixtures thereof.

Alternatively, the compositions may be substantially free of fatty acids, as a fatty acid may be difficult to solubilize in an aqueous composition. In particular, the compositions may be substantially free of lauric acid, oleic acid, stearic acid, or a combination thereof. Additional suitable anionic surfactants include alkyl sulfosuccinates, alkyl ether sulfosuccinates, olefin sulfonates, alkyl sarcosinates, alkyl monoglyceride sulfates and ether sulfates, alkyl ether carboxylates, paraffinic sulfonates, acyl methyl taurates, sulfoacetates, acyl lactates, and sulfosuccinamides.

Amphoteric surfactants are surface active agents containing at least one anionic group and at least one cationic group and may act as either acids or bases, depending on pH. Some of these compounds are aliphatic derivatives of heterocyclic secondary and tertiary amines, in which the aliphatic substituent(s) may be straight or branched, at least one of the aliphatic substituents contains from about 6 to about 20, or from about 8 to about 18, carbon atoms, and at least one of the aliphatic substituents contains an anionic water-solubilizing group, e.g., carboxy, phosphonate, phosphate, sulfonate, sulfate.

Zwitterionic surfactants are surface active agents having a positive and negative charge in the same molecule, where the molecule is zwitterionic at all pHs. Zwitterionic surfactants include betaines, sultaines, and lecithins. The zwitterionic surfactants generally contain a quaternary ammonium, quaternary phosphonium, or a tertiary sulfonium moiety. Zwitterionic surfactants contain at least one straight chain or branched aliphatic substituent, which contains from about 6 to 20, or from about 8 to about 18, carbon atoms, and at least one aliphatic substituent containing an anionic water-solubilizing group, e.g., carboxy, sulfonate, sulfate, phosphate or phosphonate.

Examples of suitable amphoteric and zwitterionic surfactants include the alkali metal, alkaline earth metal, ammonium or substituted ammonium salts of alkyl amphocarboxyglycinates and alkyl amphocarboxypropionates, alkyl amphodipropionates, alkyl monoacetate, alkyl diacetates, alkyl amphoglycinates, and alkyl amphopropionates, where the alkyl group has from 6 to about 20 carbon atoms. Other suitable amphoteric and zwitterionic surfactants include alkyliminomonoacetates, alkyliminidiacetates, alkyliminopropionates, alkyliminidipropionates, and alkylamphopropylsulfonates, where the alkyl group has from about 12 to about 18 carbon atoms, as well as alkyl betaines, alkylamidoalkylene betaines, alkyl sultaines, and alkylamidoalkylenehydroxy sulfonates.

The nonionic surfactant(s) may be any of the known nonionic surfactants, examples of which include condensates of ethylene oxide with a hydrophobic moiety. Nonionic surfactants include ethoxylated primary or secondary aliphatic alcohols having from about 8 to about 24 carbon atoms, in either straight or branch chain configuration, with from about 2 to about 40, or from about 2 and about 9 moles of ethylene oxide per mole of alcohol. Other suitable nonionic surfactants include the condensation products of alkyl phenols having from about 6 to about 12 carbon atoms with about 3 to about 100, or 3 to about 60, or 3 to about 30, or about 5 to about 14 moles of ethylene oxide. Nonionic surfactants also include ethoxylated castor oils and silicone surfactants, such as Silwet L-8610, Silwet L-8600, Silwet L-77, Silwet L-7657, Silwet L-7650, Silwet L-7607, Silwet L-7604, Silwet L-7600, and Silwet L-7280. Nonionic surfactants also include glyceryl esters, such as polyglyceryl oleate/stearate The pest control compositions of the present disclosure may optionally comprise one or more cationic surfactants. Suitable cationic surfactants include quaternary ammonium surfactants and amino surfactants that are positively charged at the pH of the pest control composition.

The weight ratio of surfactant, preferably anionic surfactant, more preferably sodium lauryl sulfate, to active ingredient is from about 1:3 to about 30:1, or about 1:3 to about 20:1, or about 1:1 to about 20:1, or about 1:1 to about 10:1, or about 1:3 to about 3:1, or about 1:2 to about 2:1, or about 1:1.5 to about 1.5:1, or about 1:1.2 to about 1.2:1. The weight ratio of surfactant, preferably anionic surfactant, more preferably sodium lauryl sulfate, to lemongrass oil may be about 1:1 to about 30:1 or about 2:1 to about 30:1. The weight ratio of surfactant, preferably anionic surfactant, more preferably sodium lauryl sulfate, to active ingredient, preferably an essential oil or a constituent thereof, may be from about 1:1 to about 30:1 or about 1:1 to about 20:1.
Solvent The pest control compositions described herein may comprise from about 0.05% to about 45%, or from about 0.1% to about 30%, or from about 1% to about 25%, or from about 1% to about 15%, or from about 8% to about 20% by weight the composition of one or more solvents. Liquid pest control compositions may contain one or more solvents and water.

Suitable solvents include alcohols, such as monohydridic or polyhydridic alcohols. Preferred monohydridic alcohols are low molecular weight primary or secondary alcohols exemplified by ethanol, propanol, and isopropanol, preferably isopropanol. Polyhydridic alcohols, such as those containing from 2 to about 6 carbon atoms and from 2 to about 6 hydroxy groups (e.g., ethylene glycol, glycerine, and 1,2-propanediol (also referred to as propylene glycol)), may also be used.

Suitable solvents also include esters. The pest control composition may comprise from about 0.005% to about 15%, or from about 0.05% to about 12%, or from about 0.5% to about 10%, or from about 1% to about 7% by weight of the composition of one or more esters. Examples of suitable esters include triethyl citrate, diethyl citrate, monoethyl citrate, isopropyl myristate, myristyl myristate, isopropyl palmitate, octyl palmitate, isopropyl isothermal, butyl lactate, ethyl lactate, butyl stearate, triethyl citrate, glycerol monooleate, glyceryl dicaprylate, glyceryl dimyristate, glyceryl dioleate, glyceryl distearate, glyceryl monomyristate, glyceryl monooctanoate, glyceryl monooleate, glyceryl monostearate, decyl oleate, glyceryl stearate, isocetyl stearate, octyl stearate, putty stearate, isostearyl neopentonate, PPG myristyl propionate, diglyceryl monooleate, and diglyceryl monostearate. The pest control composition may comprise triethyl citrate, preferably from about 0.005% to about 15%, or from about 0.05% to about 12%, or from about 0.5% to about 10%, or from about 1% to about 7% by weight of the composition of triethyl citrate.

Additional solvents include lipophilic fluids, including siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, and mixtures thereof.

Suitable solvents listed under section 25(b) of the Federal Insecticide, Fungicide, and Rodenticide Act (FIFRA) include butyl lactate (including enantiomers thereof), vinegar, 1,2-propylene carbonate, isopropyl myristate, ethyl lactate (including enantiomers thereof), and glycerine.

Preferred solvents include isopropanol, triethyl citrate, ethanol, glycerine, ethyl lactate, renewable versions thereof, and mixtures thereof. The pest control compositions described herein may comprise from about 1% to about 45%, or from about 1% to about 30%, or from about 1% to about 25%, or from about 1% to about 15% by weight the composition of a solvent selected from the group consisting of isopropanol, triethyl citrate, and mixtures thereof. The pest control compositions described herein may comprise from about 8% to about 20% by weight the composition of isopropanol. The pest control compositions described herein may comprise from about 0.3% to about 5%, preferably from about 0.3% to about 3% by weight the composition of glycerine.

pH Adjusting Agents

The pest control compositions may comprise from about 0.00001% to about 1.5%, preferably from about 0.0001% to about 1%, more preferably from about 0.001% to about 0.8%, even more preferably from about 0.01% to about 0.6%, by weight of the composition of a pH adjusting agent, such as a carboxylic acid or a salt thereof selected from the group consisting of citric acid or a salt thereof, malic acid or a salt thereof, acetic acid or a salt thereof, fumaric acid or a salt thereof, humic acid or a salt thereof, and mixtures thereof, preferably citric acid or a salt thereof, more preferably citric acid anhydrous or citric acid monohydrate. The compositions described herein may comprise from about 0.00001% to about 1.5% by weight of the composition of citric acid or a salt thereof, such as sodium citrate, monosodium citrate, disodium citrate, trisodium citrate, trisodium citrate dihydrate, potassium citrate, monopotassium citrate, tripotassium citrate, tripotassium citrate monohydrate, or dipotassium citrate. Carboxylic acids, such as citric acid, or salts thereof may function to adjust the pH of the composition and/or as a chelant.

The pest control compositions may be subject to fluctuating temperatures during shipping, storage, and/or use. The pest control compositions is preferably stable at low temperatures (i.e., from about 5° C. to about 10° C.). "Stable" may refer to a pest control composition that is substantially clear and free from phase separation or precipitation, where no agitation or mixing is required to use the composition for its application.

Without being bound by theory, it is believed that the dispensing devices disclosed herein are particularly advantageous for the targeted spraying of pest control compositions ((e.g., insecticide or herbicide) from about 0.3 m to about 1.5 m, preferably about 0.3 m to about 1 m, from the target pest or surface. The composition (including characteristics such as viscosity and surface tension), and/or the nozzle design may be selected to provide optimal spray exit velocity and particle size distribution (PSD) for spraying a pest control product on the target pest or surface at about 0.3 m to about 1.5 m, preferably about 0.3 m to about 1 m, from the target pest or surface.

The liquid spray product 3 may comprise a pest control composition comprising: (a) from about 0.5% to about 12%, preferably about 1% to about 10%, more preferably about 2% to about 8.5%, even more preferably about 3% to about 7.5%, by weight of the composition of sodium lauryl sulfate; (b) from about 0.5% to about 15%, preferably about 1% to about 10%, more preferably about 1.5% to about 8%, by weight of the composition of an active ingredient selected from the group consisting of cornmint oil, peppermint oil, spearmint oil, rosemary oil, thyme oil, citronella oil, clove oil, cinnamon oil, cedarwood oil, garlic oil, geranium oil, lemongrass oil, eugenol, geraniol, nerol, vanillin, 2-phenylethyl propionate, menthol, menthone, thymol, carvone, camphor, methyl salicylate, p-cymene, linalool, eucalyptol/1,8-cineole, alpha-pinene, bornyl acetate, gamma-terpinene, and mixtures thereof, preferably selected from the group consisting of geraniol, cornmint oil, peppermint oil, rosemary oil, lemongrass oil, and mixtures thereof; and (c) from about 60% to about 90%, preferably about 65% to about 85%, more preferably about 70% to about 80%, by weight of the composition of water.

The pest control composition may optionally further comprise from about 0.5% to about 10%, preferably from about 1% to about 5%, by weight of the composition of by weight of the composition of urea. The pest control composition may optionally further comprise from about 0.1% to about 45%, preferably from about 0.5% to about 35%, more preferably from about 1% to about 25%, even more preferably from about 2% to about 20%, by weight of the composition of by weight of the composition of a solvent selected from the group consisting of isopropyl alcohol, triethyl citrate, isopropyl myristate, ethyl lactate, butyl lactate, butyl stearate, glycerin, and mixtures thereof, preferably selected from the group consisting of isopropyl alcohol, triethyl citrate, and mixtures thereof. The pest control composition may also optionally further comprise a carboxylic acid or salt thereof selected from the group consisting of citric acid or a salt thereof, malic acid or a salt thereof, acetic acid or a salt thereof, fumaric acid or a salt thereof, humic acid or a salt thereof, and mixtures thereof, preferably citric acid or a salt thereof. The pest control composition may also optionally further comprise an ingredient selected from pH adjusting agents, propellants, preservatives, thickeners, fatty acids or salts thereof, and combinations thereof.

The pest control composition may be an oil-in-water emulsion. The pest control composition may have a turbidity less than about 20 NTU, a b* value of about 0 to about 5, or a combination thereof. The pest control composition may have a pH ranging from about 3.0 to about 11.0, or from about 4.0 to about 11.0, or from about 4.0 to about 9.0, or from about 5.0 to about 9.0, or from about 5.0 to about 8.0, or from about 6.0 to about 8.0, or from about 6.0 to about 7.0. The pest control composition may be a "low VOC" composition and comprise about 3% volatile organic compounds (VOCs) by weight or less. Alternatively, the pest control composition may comprise greater than 3% volatile organic compounds (VOCs) by weight. The pest control composition may comprise greater than 3% to about 35% by weight of volatile organic compound (VOC). It may be desirable to keep the total level of VOCs in the pest control composition to less than or equal to about 3% by weight.

VOCs can be measured according to the California Air Resources Board (CARB) Method 310 for VOC determination (May 25, 2018).

As detailed below, in the Spray Droplet Size Test Method, spray droplet volume size distribution measurements comprising Spray D(50) Normalized, Spray D(90) Normalized, and Spray D(2,3) Normalized values are determined using a Malvern Spraytec 2000 laser diffraction spray droplet sizing instrument (supplied by Malvern Instruments, Worcestershire, UK). The composition, when dispensed through the spray dispenser 5, may have a Spray D(90) ranging from about 100 microns to 1000 microns, or from about 300 microns to about 900 microns, or from about 500 microns to about 850 microns. Spray D(90) may be selected to efficiently deliver an active agent to the target surface or area. Also, a Spray D(90) in the disclosed ranges may be perceived as capable of traveling a distance of one or more meters and depositing on a target surface. Particles having a Spray D(90) less than 100 microns may create a spray that is too misty or a spray that does not have sufficient velocity to travel to a target surface.

Test Methods

Brookfield Viscosity

Brookfield viscosity is measured at 23° C.±2° C. using a Brookfield DV-E viscometer. The liquid is contained in a glass jar, where the width of the glass jar is from about 5.5 to 6.5 cm and the height of the glass jar is from about 9 to about 11 cm using spindle LV2 at 60 RPM. The test is conducted in accordance with the instrument's instructions.

pH Test Method pH can be using a standard pH meter such as, for example, a Beckman Coulter model PHI1410 pH meter equipped with a general-purpose probe (manufactured by Beckman Coulter, Brea, California, U.S.A.). The pH meter is calibrated according to the manufacturer's instructions. Measurements are performed after storing the compositions at room temperature (approximately 23° C.±2° C.) for approximately 24 hours.

Particle Size Test Method

Particle size is measured by light scattering data techniques. Particle size is determined with a Malvern Zetasizer Nano ZSP (Malvern Panalytical, Malvern, United Kingdom), or the like. The software used for control of the instrument and for data acquisition is the Malvern Zetasizer Software version 8.01.4906 (Malvern Panalytical). All samples are kept at 25° C., unless otherwise specified.

Samples are measured in BRAND® polystyrene disposable cuvettes (Cat. No. 759070D or equivalent). 1 mL of the sample is added into the cuvette using a disposable transfer pipette (VWR, Cat. No. 414004-004 or equivalent), swirled, and then discarded. Another 1 mL of the sample is added into the cuvette using a disposable transfer pipette. The cap is placed on the cuvette and all sides of the cuvette are wiped with lint-free lens paper. The cuvette is loaded into the instrument in accordance with the manufacture's specification to ensure light is passing correctly into the sample during the measurement, and the lid is closed.

The instrument is readied in accordance with manufacture's specification. The particle size measurements are made through the software with the following settings:

1) Under the 'Measure' section, the 'Manual' option is selected. 'Measurement Type' is then set to 'Size'.

2) The 'Sample' section is then selected. In the 'Material' subsection: 'Material' is chosen to be 'SDS'; the 'RI' is set to 1.461; and the 'Absorption' is set to 0.001. In the 'Dispersant' subsection: 'Dispersant' is selected as 'Water'; 'Temperature' is set to 25.0 deg C.; 'Viscosity' is set at 0.8872 cP; and 'RI' is set as 1.330. In the 'General options' subsection 'Mark-Houwink Parameters' is selected, 'A Parameter' is set to 0.428; and 'K Parameter (cm2/s)' is set to 7.67e-05. In the 'Temperature' subsection: 'Temperature' is set as 25.0 deg C.; 'Equilibration Time (second)' is set to 120. In the 'Cell' subsection: 'Cell Type' is selected to be 'Disposable cuvettes'; and the 'DTS0012' option is selected.

3) The 'Measurement' section is then selected. The 'Angle of Detection Measurement Angle' is selected as '173o Backscatter (NIBS default)'; 'Measurement Duration' is selected as 'Automatic'; 'Number of Runs' is set to 11; 'Run duration (seconds)' is set to 10; 'Number of Measurements' is set as 3; 'Delay between Measurements (seconds)' is set to 0; 'Append Measurement Number to Sample Name' is selected; and 'Allow Results to be Saved Containing Correlation Data Only' is not selected. In the 'Advanced' subsection: 'Measurement duration, Extend Duration for Large Part' is set to 'No'; 'Measurement settings, Positioning method' is set to 'Seek for Optimum Position'; and Automatic attenuation selection is set to 'Yes'.

4) The 'Data Processing' section is then selected, and the following options are selected: 'Analysis Model' is selected as 'General Purpose (Normal Resolution)'. The 'Size Analysis Parameters' are set to: 'Analysis Details'; 'Name' is set to 'Customized', 'Description' is set to 'Customized Analysis'; 'Display Range' is set with the 'Lower Limit' set to 0.6 and 'Upper Limit' set to 6000; 'Multimodal—analysis, Resolution' is selected to 'Normal'; 'Size classes, Number of size classes' is set as 70; 'Lower Size Limit' is set as 0.4; 'Upper Size Limit' is set as 10,000; 'Lower Threshold' is set as 0.05; and 'Upper Threshold' is set as 0.01. In the 'Reports' subsection: 'Print Report' is not selected and in the 'Export' subsection: 'Export' results is not selected.

Spray Droplet Size Test Method

The term "Dv10 value" describes the average particle size where 10 vol. % of the particles have a smaller size. Similarly, the term "Dv50 value" describes the average particle size where 50 vol. % of the particles have a smaller size, and the term "Dv90 value" describes the average particle size where 90 vol. % of the particles have a smaller size. The Sauter mean diameter (D[3, 2]) is the weighted average surface diameter, assuming spherical particles of the same surface area as the actual particles:

$$D[3, 2] = \frac{\sum D_i^3 n_i}{\sum D_i^2 n_i}.$$

Spray droplet volume size distribution measurements comprising Spray D(50) Normalized, Spray D(90) Normalized, and Spray D(2,3) Normalized values are determined using a Malvern Spraytec 2000 laser diffraction spray droplet sizing instrument (supplied by Malvern Instruments, Worcestershire, UK), equipped with a 300 mm lens possessing a focal length of the 150 mm, and an Air Purge System (not greater than 14.5 psi). The system is controlled with a computer and software accompanying the instrument, such as the Spraytec software version 3.20 or equivalent, utilizing Mie Theory and Fraunhofer Approximation optical theory. The system is placed in a fume hood for atmospheric control with care taken to place it directly opposite the actuation spray plume trajectory to prevent saturation, with an air flow rate of between 50-70 L/min (60 L/min was the target rate). The distance from the dispensing nozzle orifice to the laser during measurements is 30 cm. A new spray bottle is used for each sample replicate analyzed. Lighting conditions are not changed during or between the background control and test sample data collection periods. Light obscuration values below 95% are considered suitable to provide accurate results.

Samples analyzed included "example" samples, which are samples according to this disclosure, and comparative samples. All newly created example samples are tested within three hours of preparation and are measured at temperatures between 20-22° C. Deionized water is used as a standard reference spray and is labeled as the "control."

Spray measurements are conducted using the following spray SOP instrument configuration: Rapid SOP type is chosen, and the following settings are selected: Hardware Configuration is set to "Default", Measurement Type is set to "Rapid", Data Acquisition Rate is set to "250 Hz", and Lens Type is set to "300". Within the Measurement menu: Background is set to "3 seconds", Inspection is selected, the box under Output Trigger is Unchecked. Under the Measurement tab "Rapid" is selected, Events Number is set to "1", Duration Per Event is set to "4000.0", Units is set to "ms". Measurement Trigger where Trigger Type is set to "Transmission drops to level" and Transmission is set to "96", Data Collection where Start is set to "52", Units is set to "ms", and select "before the trigger" from the drop down menu. On the Advanced tab window, all boxes are Unchecked, and Grouping is "no grouping"; The Background Alarms are set to "default values". On the Analysis Tab and under Optical Properties, Particle Set is set to "Water", Dispersant set to "Air", Multiple Scattering Analysis is set to "Enable". On the Data Handling tab and under Detector Range is set to "first: 1 and last: last", "No extinction analysis" box is selected, Scattering threshold is set to "1". On the Data Handling/Spray Profile the Path Length is set to "100.0", the Alarm is selected, and the "Use default values" box is checked. On the Additional Properties tab the Curve Fit is set to "no fit", User Size is set to "enable box", the drop down menu is set to "Default". On the Additional Properties/Advanced tab Particle Diameter is set to "0.10" for the minimum and to "900" for the maximum, and Result Type is set to "Volume Distribution". On the Output tab, Export Option is set to "not selected", the Derived Parameter is selected, the Use Averaging Period box is selected and set to "0.0" and "ms". On the Average menu "Average scatter data" is selected.

Spray measurements are conducted using the following Spray Procedure: The sample is first test sprayed from the spray bottle for 1-2 seconds, to ensure that the nozzle is free flowing and not clogged; the sample is loaded into the holding device in the front of the Spraytec 2000 system. The actuator is fully depressed. The spray droplet size data are viewed and saved as "Average Scatter Data".

a. The value obtained from each sample measurement is normalized to the control sample value in accordance with the following calculations:

The value of Spray $D(50)$ Normalized=$D(50)_{Example}/D(50)_{Control}$;

The value of Spray $D(90)$ Normalized=$D(90)_{Example}/D(90)_{Control}$;

The value of Spray $D(3,2)$ Normalized=$D(3,2)_{Example}/D(3,2)_{Control}$;

wherein:

Spray $D(50)$, Spray $D(90)$, and Spray $D(3,2)$ are values obtained from the instrument software for both the example samples and control samples separately.

Each of the Spray $D(90)$ Normalized and Spray $D(3,2)$ Normalized values reported for each of the samples is the average value calculated from five replicate spray plumes per sample.

Determination of the Hunter L.a.b. (CIE) b* Value

The formation of yellow color is measured using the Hunter L.a.b. (CIE) method. The b* value is determined using a HunterLab ColorFlex EZ® spectrophotometer (HunterLab, 11491 Sunset Hills Road, Reston, Virginia 20190). The methodology that is used is described in detail in the "User's Manual for ColorFlex EZ Version 2.2."

The HunterLab ColorFlex EZ® spectrophotometer uses a xenon flash lamp to illuminate a sample. The light reflected from the sample is then separated into its component wavelengths through a dispersion grating. The relative intensities of the light at different wavelengths along the visible spectrum (400-700 nm) are then analyzed to produce a number result indicative of the color of the sample.

Turbidity Method

A turbidimeter is used to measure the turbidity of the compositions. This instrument measures the turbidity of liquids in Nephelometric Turbidity Units (NTU). The method of measuring turbidity is described in detail in the following reference: Hach 2100Q and 2100Q is User Manual, Edition 6, August 2021, from the Hach Company. If a sample is not homogenous prior to analysis, the sample is inverted until it appears homogenous and is then poured into an analyte vile for measurement.

This method of measurement determines quantitative values of turbidity by evaluating the ratio of a primary nephelometric light scatter signal to a transmitted light scatter signal. This particular method of evaluation provides values between 0-1000 NTU, where increasing NTU values indicate more turbid compositions. In between each test sample, water controls may be measured to ensure proper equipment operation. For example, water may have a turbidity of about 1.11 NTU and isopropyl alcohol may have a turbidity of about 0.15 NTU. It is believed that improved emulsification of active ingredients, particularly hydrophobic active ingredients, yields lower NTU values.

Surface Tension Method

Surface tension is measured according to ASTM 1331-14 (Published January 2015) using an EZ-Pi tensiometer (Kibron, Parrish, Fla.), or equivalent. The instrument is calibrated according to the manufacturer instructions using DI water. Measurements are taken and values are reported in mN/m.

Temperature Stability Method

Samples are prepared by combining all composition ingredients in a 4-ounce glass vial at ambient conditions (25 deg. C.). The sample is mixed and, five minutes after mixing is completed, the sample is observed for initial stability.

Cold temperature cycle stability is measured by filling a 4-ounce glass vial with a sample composition. The vial is sealed and stored at 5° C. for 12 to 14 hours. The vial is then moved to a 25° C. environment and stored for 10 to 12 hours, thereby completing one cold temperature cycle. This is repeated two more times, for a total of three cold temperature cycles. After the final incubation at 25° C., the vials are visually observed for stability (and may be assessed for turbidity and b* value using the Turbidity and Hunter L.a.b. (CIE) method described above).

Force to Actuate

Methods for measuring force to actuate are described in U.S. patent Ser. No. 10/850,914 and U.S. Pat. No. 8,322,631, both of which are hereby incorporated by reference herein.

Examples

Nozzles of varying geometries/dimensions, such as orifice diameter, orifice land length, swirl chamber diameter, swirl chamber depth, horizontal/vertical inlet port width, and horizontal/verticals inlet port depth, are tested. The nozzle geometries/dimensions are shown in Tables 1 and 2, using the same abbreviations as in the figures, which are described above. Specifically, the diameter of the outlet orifice is labeled $d_o$, the diameters of the swirl chambers are labeled $D_{s1}$, $D_{s2}$, the land length of the outlet orifice is labeled $l_o$, the depths of the swirl chambers are labeled $S_{d1}$, $S_{d2}$. The values are given in millimeters. Tables 1 and 2 further indicate the number of vertical/horizontal inlet ports.

TABLE 1

| | | Min | Max | A | B | C | D | E | F |
|---|---|---|---|---|---|---|---|---|---|
| $d_o$ | orifice diameter (mm) | 0.50 | 0.70 | 0.60 | 0.50 | 0.60 | 0.53 | 0.53 | 0.70 |
| $l_o$ | orifice land length (mm) | 0.90 | 1.49 | 1.49 | 1.49 | 1.49 | 1.34 | 1.34 | 1.49 |
| $D_{s1}$ | Spin Chamber 1 Diameter (mm) | 1.30 | 2.10 | 1.90 | 1.90 | 1.90 | 1.30 | 1.30 | 1.70 |
| $S_{d1}$ | Spin Chamber 1 Depth (mm) | 0.38 | 0.63 | 0.53 | 0.53 | 0.63 | 0.51 | 0.51 | 0.53 |
| $D_{s2}$ | Spin Chamber 2 Diameter (mm) | 0 | 1.10 | 1.10 | 1.10 | 1.10 | n/a | n/a | 1.10 |
| $S_{d2}$ | Spin Chamber 2 Depth (mm) | 0 | 0.29 | 0.29 | 0.29 | 0.29 | n/a | n/a | 0.29 |
| $T_h$ | Number of horizontal inlet ports | 2 | 5 | 2 | 3 | 3 | 4 | 5 | 3 |
| $T_v$ | Number of vertical inlet ports | 2 | 5 | 2 | 3 | 3 | 4 | 5 | 3 |
| $H_a$ | Horizontal inlet port Angle (deg.) | 90 | 90 | 90 | 90 | 90 | 90 | 90 | 90 |
| $H_w$ | Horizontal inlet port Width (mm) | 0.75 | 1.15 | 0.97 | 0.97 | 0.97 | 0.75 | 0.75 | 0.97 |
| $H_d$ | Horizontal inlet port Depth (mm) | 0.38 | 0.63 | 0.53 | 0.53 | 0.63 | 0.51 | 0.51 | 0.53 |
| $V_w$ | Vertical inlet port Width (mm) | 0.75 | 1.15 | 0.97 | 0.97 | 0.97 | 0.75 | 0.75 | 0.97 |
| $V_d$ | Vertical inlet port Depth (mm) | 0.24 | 0.41 | 0.41 | 0.41 | 0.41 | 0.24 | 0.24 | 0.41 |
| $C_d$ | Nozzle inner diameter (mm) | 2.6 | 2.6 | 2.6 | 2.6 | 2.6 | 2.6 | 2.6 | 2.60 |

TABLE 2

| | | Min | Max | G | H | I | J | K |
|---|---|---|---|---|---|---|---|---|
| $d_o$ | orifice diameter (mm) | 0.50 | 0.70 | 0.70 | 0.60 | 0.60 | 0.60 | 0.60 |
| $l_o$ | orifice land length (mm) | 0.90 | 1.49 | 1.49 | 1.49 | 1.49 | 1.49 | 0.90 |
| $D_{s1}$ | Spin Chamber 1 Diameter (mm) | 1.30 | 2.10 | 1.90 | 2.10 | 1.90 | 1.90 | 1.90 |
| $S_{d1}$ | Spin Chamber 1 Depth (mm) | 0.38 | 0.63 | 0.53 | 0.53 | 0.53 | 0.38 | 0.51 |
| $D_{s2}$ | Spin Chamber 2 Diameter (mm) | 0 | 1.10 | 1.10 | 1.10 | 1.10 | 1.10 | N/A |
| $S_{d2}$ | Spin Chamber 2 Depth (mm) | 0 | 0.29 | 0.29 | 0.29 | 0.29 | 0.29 | N/A |
| $T_h$ | Number of horizontal inlet ports | 2 | 5 | 3 | 3 | 3 | 3 | 2 |
| $T_v$ | Number of vertical inlet ports | 2 | 5 | 3 | 3 | 3 | 3 | 2 |
| $H_a$ | Horizontal inlet port Angle (deg.) | 90 | 90 | 90 | 90 | 90 | 90 | 90 |
| $H_w$ | Horizontal inlet port Width (mm) | 0.75 | 1.15 | 0.97 | 0.97 | 0.97 | 0.97 | 0.75 |
| $H_d$ | Horizontal inlet port Depth (mm) | 0.38 | 0.63 | 0.53 | 0.53 | 0.53 | 0.38 | 0.51 |
| $V_w$ | Vertical inlet port Width (mm) | 0.75 | 1.15 | 0.97 | 0.97 | 0.97 | 0.97 | 0.75 |
| $V_d$ | Vertical inlet port Depth (mm) | 0.24 | 0.41 | 0.41 | 0.41 | 0.41 | 0.30 | 0.24 |
| $C_d$ | Nozzle inner diameter (mm) | 2.60 | 2.60 | 2.60 | 2.60 | 2.60 | 2.60 | 2.60 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid spray product comprising a spray dispenser connected to a container containing a liquid pest control composition comprising:
   a) from about 0.5% to about 12% by weight of the composition of sodium lauryl sulfate;
   b) from about 0.5% to about 15% by weight of the composition of an active ingredient selected from the group consisting of cornmint oil, peppermint oil, spearmint oil, rosemary oil, thyme oil, citronella oil, clove oil, cinnamon oil, cedarwood oil, garlic oil, geranium oil, lemongrass oil, eugenol, geraniol, nerol, vanillin, 2-phenylethyl propionate, menthol, menthone, thymol, carvone, camphor, methyl salicylate, p-cymene, linalool, eucalyptol/1,8-cineole, alpha-pinene, bornyl acetate, gamma-terpinene, and mixtures thereof, and
   c) from about 55% to about 90% by weight of the composition of water;
      wherein the spray dispenser comprises a nozzle, a buffer system, and a pump;
      wherein the nozzle comprises an outlet orifice, one or more swirl chambers, one or more vertical inlet ports, and one or more horizontal inlet ports, wherein the one or more vertical inlet ports are in fluid communication with the one or more horizontal inlet ports and the one or more horizontal inlet ports are in fluid communication with the one or more swirl chambers and the outlet orifice.

2. The liquid spray product according to claim 1, wherein the liquid pest control composition has a viscosity of from about 1 cps to about 500 cps.

3. The liquid spray product according to claim 1, wherein the liquid pest control composition has a surface tension ranging from about 10 mN/m to about 60 mN/m.

4. The liquid spray product according to claim 1, wherein the force to actuate the spray dispenser ranges from about 8 lb/pull to about 14 lb/pull.

5. The liquid spray product according to claim 1, wherein at 90 strokes/minute, the output volume is about 85% to about 99% of the output volume at 10 strokes/minute.

6. The liquid spray product according to claim 1, wherein the liquid spray product has a flow rate of about 0.5 g/pull to about 1.50 g/pull.

7. The liquid spray product according to claim 1, wherein the liquid pest control composition is formulated to provide a spray having a Sauter mean diameter of about 200 μm to about 500 μm.

8. The liquid spray product according to claim 1, wherein the liquid pest control composition is formulated to provide a spray having a D(90) of about 500 μm to about 850 μm.

9. The liquid spray product according to claim 1, wherein the ratio of the flow rate to the force to actuate is about 0.05 g/pound to about 0.2 g/pound.

10. The liquid spray product according to claim 1, wherein the liquid pest control composition comprises from about 0.1% to about 45% by weight of the composition of a solvent selected from the group consisting of isopropyl alcohol, triethyl citrate, isopropyl myristate, propylene carbonate, ethyl lactate, butyl lactate, butyl stearate, glycerin, and mixtures thereof.

11. The liquid spray product according to claim 1, wherein the liquid pest control composition comprises a pH adjusting agent selected from the group consisting of malic acid, citric acid, fumaric acid, humic acid, acetic acid, monosodium citrate, sodium citrate, disodium citrate, trisodium citrate, trisodium citrate dehydrate, trisodium citrate pentahydrate, sodium acetate, and combinations thereof.

12. The liquid spray product according to claim 1, wherein the liquid pest control composition has a turbidity less than about 20 NTU.

13. The liquid spray product according to claim 1, wherein the liquid pest control composition has a b* value of about 0 to about 5.

14. The liquid spray product according to claim 1, wherein the liquid pest control composition has a pH of about 5.0 to about 9.0.

15. The liquid spray product according to claim 1, wherein the container is transparent or translucent.

16. The liquid spray product according to claim 1, wherein the liquid pest control composition is formulated to provide a spray having a D(50) value of about 200 μm to about 500 μm.

17. A method of controlling a pest comprising:
   a. providing the liquid spray product according to claim 1,
   b. dispensing the liquid spray product at a target pest.

* * * * *